United States Patent

Lavie et al.

[11] Patent Number: 5,864,651
[45] Date of Patent: Jan. 26, 1999

[54] SYSTEM AND METHOD FOR ON-DEMAND PRINTING

[75] Inventors: Reuven Lavie, Herzlia; Shlomo Birman, Netanya; Arie Z. Gordon, Holon, all of Israel

[73] Assignee: Scitex Corporation Ltd., Herzlia, Israel

[21] Appl. No.: 715,706

[22] Filed: Sep. 19, 1996

Related U.S. Application Data

[63] Continuation of Ser. No. 672,325, Jun. 25, 1996.

[30] Foreign Application Priority Data

Jun. 25, 1995 [IL] Israel ........................................ 144330
Dec. 12, 1995 [IL] Israel ........................................ 116243

[51] Int. Cl.$^6$ .................................................. G06F 15/00
[52] U.S. Cl. ........................................... 395/114; 395/115
[58] Field of Search .................................. 395/114, 115, 395/116, 112, 102, 101, 106, 110, 113, 117; 382/180, 176, 244, 245, 243, 242, 233, 235, 237, 239; 358/426, 261.1, 261.3, 432, 404, 444, 429

[56] References Cited

U.S. PATENT DOCUMENTS

| | | | |
|---|---|---|---|
| 4,727,589 | 2/1988 | Hirose et al. ............... | 395/200.47 |
| 5,031,115 | 7/1991 | Hayashi ..................... | 395/101 |
| 5,113,249 | 5/1992 | Yosefi ....................... | 358/515 |
| 5,245,441 | 9/1993 | Ruben ....................... | 358/426 |
| 5,293,251 | 3/1994 | Corcoran et al. .......... | 358/426 |
| 5,552,898 | 9/1996 | Deschuytere .............. | 358/426 |

FOREIGN PATENT DOCUMENTS 2276060 9/1994 United Kingdom .

OTHER PUBLICATIONS

K. Oka and M. Onishi, "Implementation of Image Compression for Printers", *Color Hard Copy and Graphic Arts (1992)*, SPIE vol. 1670, pp. 450–454.

ITU–T; "Standardization of Group 3 Facsimile Apparatus for Document Transmission": 1994: pp. 1–55.

*Primary Examiner*—Edward L. Coles
*Assistant Examiner*—Dov Popovici
*Attorney, Agent, or Firm*—Darby & Darby

[57] ABSTRACT

A system and method for on-demand printing is provided. The system includes at least one image capturing device, preferably a digital camera, which captures images during an event. The images captured by the digital cameras are transmitted to at least one printing station in which the captured images are stored and displayed, preferably but not necessarily after editing. The spectators of the event may request during the event, or shortly after, that any of the displayed images will be printed and the printing system of the present invention is suited to address their request on demand, i.e. it prints the desired image within a short time, preferably in the range of tens of seconds.

2 Claims, 7 Drawing Sheets

SYSTEM AND METHOD FOR ON-DEMAND PRINTING

This application is a continuation of U.S. patent application Ser. No. 08/672,325, filed Jun. 25, 1996.

FIELD OF THE INVENTION

The present invention relates to a system and method for printing, on demand, printed images of scenes of an event during a time frame comprising the duration of the event and a relatively short while thereafter.

BACKGROUND OF THE INVENTION

Spectators of events, such as sports events often wish to purchase a souvenir as a memoir of the event they have attended. Typical souvenirs include items which are indirectly related to the event. For example, hats, shirts, pins or any other item bearing the symbol and name of the sports team are souvenirs not related to the particular event in which a person actually takes part as a spectator.

However, it is not practical to record images of an event in progress and simultaneously or within a short time thereafter produce a print therefrom. Images generally require a large amount of storage space and preferably the process of capturing the image and then transferring it onwards for printing is best achieved by compressing (and later de-compressing) the images.

Representing an image as digital data (typically in a bitmap) requires a large amount of storage space. For example, if the image is of the A3 size (11.5 in×17 in) at 300 dots per inch (dpi) resolution, the image will have 17.4 million pixels. If the image is a color image stored at 32 bits/pixel, the image will require 66 Mbytes of storage. To print a stored image requires a printer having a large amount of Random Access Memory (RAM), which increases the cost and size of memory circuits. To reduce the amount of space required for storage, numerous compression techniques have been developed.

However, for the compression technique to be effective, it has to be "lossless", that is the decompressed image must strongly resemble the original image. The Joint Photographic Experts Group (JPEG) has a still-image coding scheme which provides a virtually lossless compression ratio of 7:1 for "bitmap" images (for example, images produced from photographs). A compression ratio of 2:1 is usually lossless.

Unfortunately, for artificial images such as are produced in a pre-press environment, the JPEG compression technique provides an unacceptably high amount of loss. Such artificial images, or "pages", are common to many publications and are combinations of bitmap images, text and vectors. The JPEG compression technique cannot compress the text and shape elements of the 'page' without significant losses in the quality of the areas surrounding the lines forming the text and shape elements. JPEG is not suitable for printers requiring good image quality.

Other compression techniques are known. For example, the page can be run-length encoded, such as via the Linework format of Scitex Corporation Ltd. of Herzlia, Israel. In run-length encoding, each sequence of neighboring pixels which have the same color pixels are compressed into a color value and a length of the run of similar colored pixels. Run-length encoding provides varied compression ratios which depend on the amount of color changes in the image. For images, such as text, which have long lengths of similar colored pixels, run-length encoding provides 1:20 compression ratios for a whole page. However, for continuous tone images, such as those scanned from a photograph, run-length encoding provides terrible compression ratios of up to 2:1 (i.e. the "compressed" image is twice as large as the uncompressed one).

The article "Implementation of Image Compression for Printers", by K. Oka and M. Onishi, *Color Hard Copy and Graphic Arts,* SPIE Vol. 1670, 1992, describes a compression technique for artificial images. Their compression technique utilizes a block truncation coding (BTC) technique which codes a 4×4 pixel block of page data. An original image with 24 bits/pixel for each color component is compressed into 9 bits/pixel, a compression ratio of 3:8. The BTC technique has the advantage of being able to compress both computer graphics and text images. However, the BTC technique does not produce a small compressed file. For certain applications, further compression is still required.

SUMMARY OF THE INVENTION

An object of the present invention is to provide a system which provides printed images of an event on demand within a predetermined time frame which preferably includes the time of the event and a relatively short time after.

It is a further object of the present invention to provide an improved compression technique for the event images (or pages) which include at least bitmap images and text. It is a still further object of the present invention to compress the pages sufficiently to enable printing, generally from hard disk or other magnetic storage device.

According to one aspect of the invention, there is provided a system which includes at least one image capturing device, preferably a digital camera, which captures images during the event. The images captured by the digital cameras are transmitted to at least one printing station in which the captured images are stored and displayed, preferably but not necessarily after editing. The spectators of the event may request during the event, or shortly after, that any of the displayed images will be printed and the printing system of the present invention is suited to address their request on demand, i.e. it prints the desired image within a short time, preferably in the range of tens of seconds.

According to an aspect of the invention, a limited number of each image may be printed for spectators upon their demand so as to limit the number of copies of each printed image in order to create an exclusive and limited edition of the printed images so as to increase their value.

An important aspect of the present invention is that the printing time of each image is substantially lower than the total time frame in which printed images are available on demand, typically by three orders of magnitude. Preferably, the total time frame includes the duration of the event and a short while thereafter.

For example, in an event which time frame is three hours, it is desired that selected images will be printed on demand within 10 to 20 seconds so as to enable printing of few hundred copies of a selected scene.

According to the present invention the ability to print on demand in rates of tens of seconds is realized by editing and storing the captured images in at least a high resolution format and a low resolution format.

According to a preferred embodiment of the present invention, the high resolution format is a run-length encoding format, also termed the Line-Work (LW) format and the low resolution format is the Continuous Tone (CT) format.

The term LW refers herein and in the claims to an original or reproduced binary image or portions thereof which include shapes and do not contain different gray values.

The term CT refers herein and in the claims to an original or reproduced image or any portions thereof which include an assortment of tone values that range from minimum density to maximum density in any amount.

Further, the ability to output good quality prints at rates of tens of seconds is realized by employing an automatic step of trapping, a method which eliminates defects in registering color separations during the build-up of color prints.

There is thus provided, according to a preferred embodiment of the present invention, a method for printing on demand printed images of scenes of an event during a time frame comprising the duration of the event and a relatively short while thereafter which includes the steps of:

a) providing at least one image capturing device, preferably a digital camera, for capturing images of scenes of the event during the event;
 b) transmitting the captured images;
 c) providing at least one printing station located at the site of the event for receiving the transmitted images;
 d) displaying a selected number of the received images; and
 e) providing, per a spectator request at least one printed image of individual ones of the received images, wherein the time in which the at least one printed image is printed is substantially smaller than the duration of the event.

Further, the transmitted images may be compressed prior to their transmission and decompressed after they are received by the at least one printing station.

Still further, the method may also include the step of preprocessing image editing image after the step of transmitting. Additionally, the method may include the step of storing the preprocessed images.

In accordance with a preferred embodiment of the present invention, the step of preprocessing image editing prior to storing includes the step of converting the format of the transmitted image to at least a high resolution format and a low resolution format. The preferred high and low resolution formats are, respectively, the run length encoding format and the continuous tone format.

Further, according to a preferred embodiment of the present invention, the method may also include the step of preprinting image editing prior to the step of printing. Preferably, the step of preprinting image editing includes the step of automatic trapping.

Additionally, the step of preprinting image editing also includes the step of identifying the printed image by selected ones from the group consisting of a serial number, date, time of the event, explanatory text and names of the participants in the event.

According to a preferred embodiment of the present invention, the method may also include the step of incorporating an image of the spectator into the printed image.

Additionally, there is also provided, in accordance with a preferred embodiment of the present invention a system for printing on demand printed images of scenes of an event during a time frame comprising the duration of the event and a relatively short while thereafter, the system includes at least one image capturing device, preferably a digital camera, for capturing images of scenes of the event during the event and at least one printing station located at the site of the event for receiving the captured images from the at least one image capturing device. The printing station includes an image editing workstation, for displaying a selected number of the captured images and a printer connected thereto for providing, per spectator request, a printed image of the captured images. The time in which the printed image is printed is substantially smaller than the duration of the event.

Finally, there is also provided, in accordance with a preferred embodiment of the present invention an improved compression technique which splits each page into CT image files and files having text and vector data. The CT image file is compressed according to any image compression technique, such as the JPEG technique, and the remaining text and vector data are encoded according to run-length encoding techniques. Since the CT image is typically the background of a page, and the text and vector data often cover significant portions of the CT image, the amount of CT image data to be compressed is often small. The resultant compressed encoded data can be stored.

Upon decompression, the CT image portion is decompressed in parallel to the decoding of the text and vector encoded data. The output of the decompressor and the decoder are mixed together and the result can be provided to any suitable output device.

Since the stored data files are highly compressed, the page can be printed directly from a disk without the need to temporarily store the bitmap of the entire page in a temporary storage device, such as a RAM.

According to the invention, there is provided a method for compressing a page which includes CT images, text and graphical constructs. The method includes the steps of separating the initial page into a CT image page and a linework page, wherein the CT image page has only the CT image elements in their locations in the initial page and the linework page has only the text and vector data in their locations in the initial page.

The method also includes the steps of compressing the CT image page and storing the compressed CT image page on a storage medium and encoding the linework page in a run-length encoded format and storing the resultant encoded linework page on the storage medium.

The storage medium may be a magnetic or optical storage medium.

Furthermore, according to a preferred embodiment of the present invention, there is also provided a method for printing an initial page including CT images, text and vector data. The method includes the steps of retrieving a first file of a compressed CT image page and a second file of an encoded linework page from a magnetic storage medium, wherein the CT image page has only the CT image elements in their locations in the initial page and the linework page has only the text and vector data in their locations in the initial page. This method also includes the steps of decompressing the first file of the compressed CT image page in order to produce a larger, third file of the CT image page, decoding the second file of the encoded linework page thereby to produce a larger, fourth file of the linework page, the fourth file and the third file may be of the same size and combining the third and fourth files together thereby to produce a section of the initial page. The method also includes the steps of transferring the section of the initial page to a printer for printing and repeating the steps of retrieving, decompressing, decoding, mixing and transferring until the initial page is fully printed. The steps of decompressing, decoding, mixing and transferring occur over generally the same amount of time that the step of retrieving occurs.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
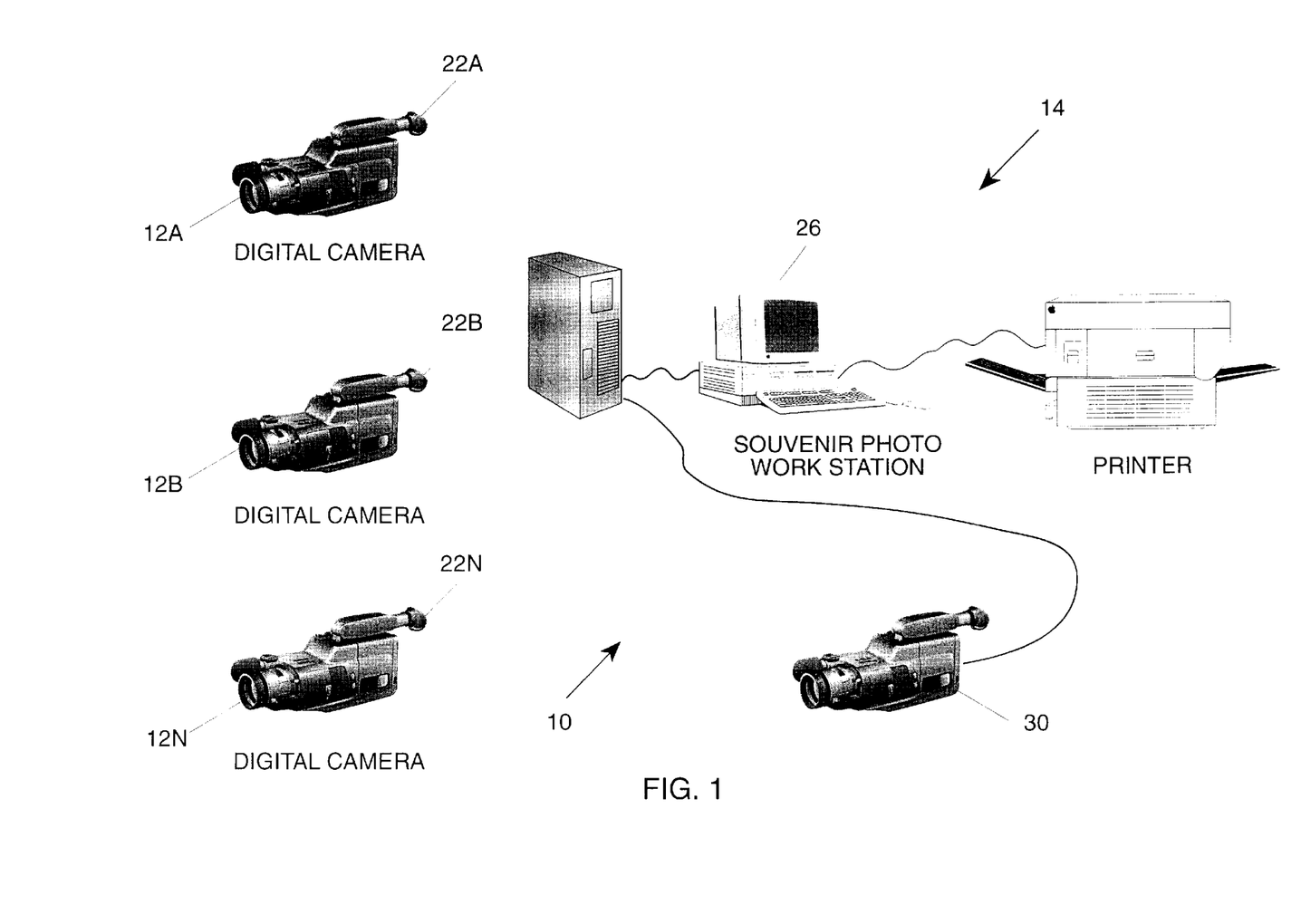
FIG. 1 is a schematic pictorial illustration of an on demand printing system, constructed according to a preferred embodiment of the present invention.

Reference is now made to FIG. 1. FIG. 1 illustrates an on demand printing system operating in a site in which an event, such as a sports game, takes place. Preferably, the system 10 operates within a predetermined time frame, such as during the event and a short while afterwards so as to provide the spectators a guaranteed limited number of on-demand printed images of scenes taken during the event as souvenirs.

The system of FIG. 1, generally referenced 10, preferably comprising a plurality of digital cameras, such as the DCS 200, commercially available from Eastman Kodak Co. of Rochester, N.Y., U.S.A, of which three referenced 12A, 12B and 12N and collectively 12 are shown herein and a plurality of on demand printing stations of which only one referenced 14 is shown herein.

It will be appreciated that the three digital cameras 12 and the printing station 14 are shown herein by way of example and that the system 10 may include any desired number of digital cameras and printing stations.

Each one of the digital cameras 12 operates to capture images of the event and to broadcast them to the printing station 14. Preferably, any suitable wireless broadcasting method, such as microwave, between the transmitters 22A, 22B and 22N and the receiver 24 which are illustrated only for illustration purposes by antenna, may be employed. Alternatively, wired communication may be used.

Printing station 14 preferably includes an editing workstation 26 and a printer 28. In the illustrated embodiment, the editing workstation 26 is a color editing station and the printer 28 is a color printer. It will be appreciated that the present invention equally applies to grey level or to black and white images.

The editing workstation 26 may be any suitable workstation, such as a Macintosh desk-top computer system commercially available from Apple of California, U.S.A. The printer 28 may be any suitable color printer, such as the Majestic, manufactured and sold by Fuji-Xerox of Japan.

As an optional feature, the printing station 14 may include an image capturing device, such as a digital camera 30 for capturing an image of a spectator who requests a printed image and for incorporating it in the printed image of the scene of the event.

Figure 2:
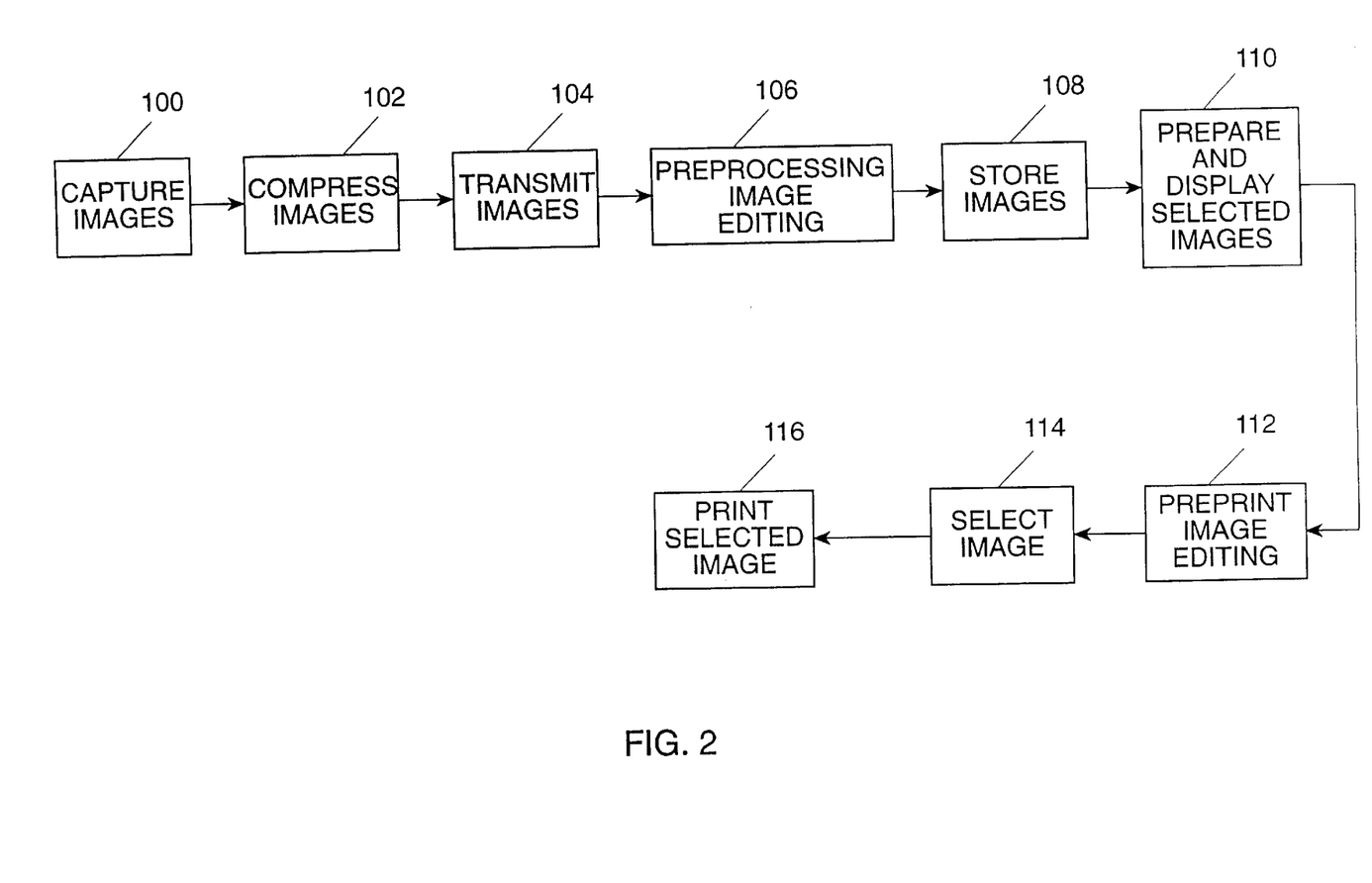
FIG. 2 is a schematic flow chart illustration of a preferred method for operating the system of FIG. 1.

As shown in FIG. 2, the preferred method of employing the system of FIG. 1 includes the following steps:

Step 100—Digital cameras 12 capture images of scenes of the event.

Step 102—Each captured image is preferably compressed.

Step 104—The compressed images are transmitted to the printing station 14.

Step 106—The received images are decompressed if required and are edited as described in detail with reference to FIG. 3 hereinbelow.

Step 108—After preprocessing image editing (step 106), the images are stored in a storage device of the workstation 26.

It will be appreciated that the operator of the workstation 26 performs the steps of preprocessing image editing 106 and image storage 108 only on selected ones of the captured images so as to provide a limited selection yet of the better scenes of the event of the printed images.

Step 110—The operator of the workstation 26 selects images to be displayed to the spectators. This selection may vary during the event. For example, if it is desired to limit the number of printed images of each scene, the operator exclude a scene from the displayed selection after the desired amount of copies have been printed.

Step 112—The selected images are edited so as to enable their printing.
This step is described in detail with reference to FIG. 4 hereinbelow.

Step 114—A spectator selects one of the preprinted edited images on display and upon his selection, a printed copy is printed.

Optionally, the image of the spectator who purchases the printed image may be taken by digital camera 30 and his image can be incorporated into the printed image, to enhance the authenticity of the souvenir.

It will be appreciated that the printing station 14 preferably operates only during the event and shortly thereafter. Therefore, the printing station 14 must be designed to print the image on demand in a very short time so as to enable to print a large enough number of copies during the time frame of the event and shortly thereafter.

For example, in an event such as a sports event which typically lasts two–three hours, in order to enable a significant, yet a limited number of spectators, to purchase printed images of scenes of the event, the printing system 14 must print on demand within tens of seconds.

It is a particular feature of the present invention that printing is done in real time during the event on demand and in just tens of seconds. This enables a large number of spectators of the event to purchase a printed image of good quality of a scene of the event as a memoir or a souvenir.

It will be appreciated that on one hand, a large enough number of printed copies should be printed so as to ensure economic viability of the system 10. On the other hand, by limiting the number of good quality printed images of each scene of the event, their value as a valuable souvenir of the event increases.

According to the present invention, the method described hereinabove ensures that the desired amount of images may be printed employing the system 10. Furthermore, according to the present invention, the steps of preprocessing image editing 106 and preprinting image editing 112 are designed so as to ensure that the system 10 provides the adequate number of printed images within the time frame of the event and a short time thereafter.

Figure 3:
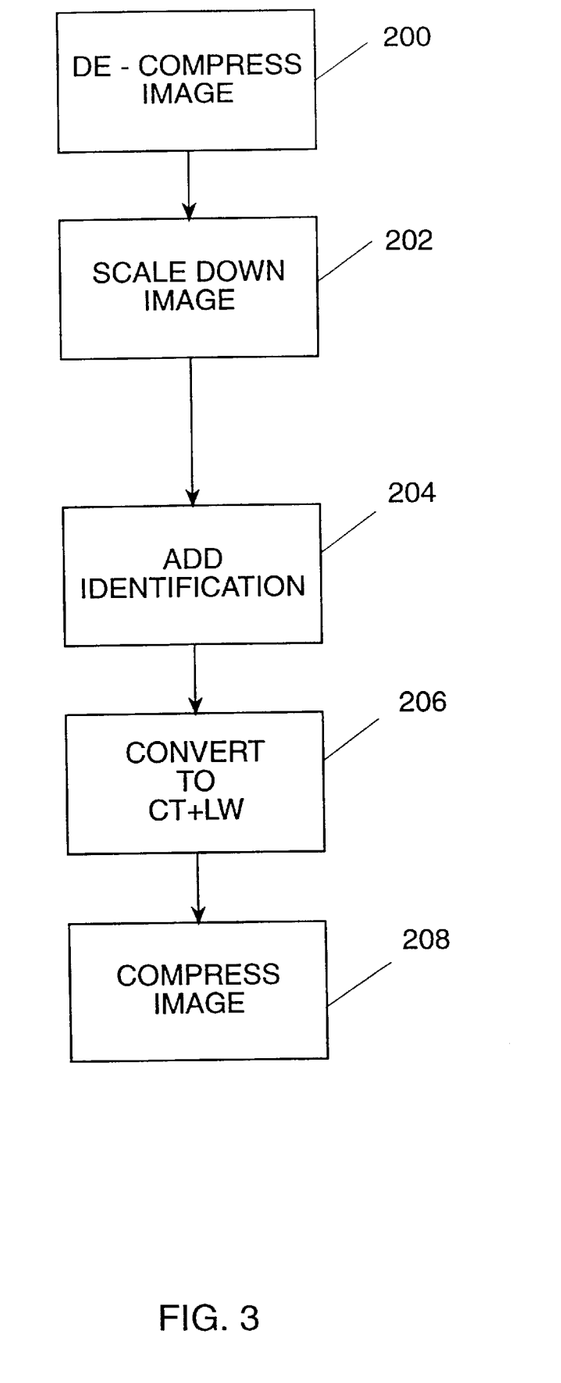
FIG. 3 is a schematic flow chart illustrations of the step of preprocessing image editing of the method of FIG. 2.

As seen in FIG. 3, the preprocessing image editing 106 preferably includes the following steps:

Step 200—the compressed images are decompressed.

Step 202—the size of the image is reduced so as to fit it to the size of the displayed images.

Step 204—An identification of the image, such as a code and the time of the scene during the event may be added.

Step 206—The format of the image is converted into a high resolution format and a low resolution format. Preferably text elements in the image are stored in the run length encoding (LW) format and graphic elements are stored in the low resolution continuous tone (CT) format.

Figure 4:
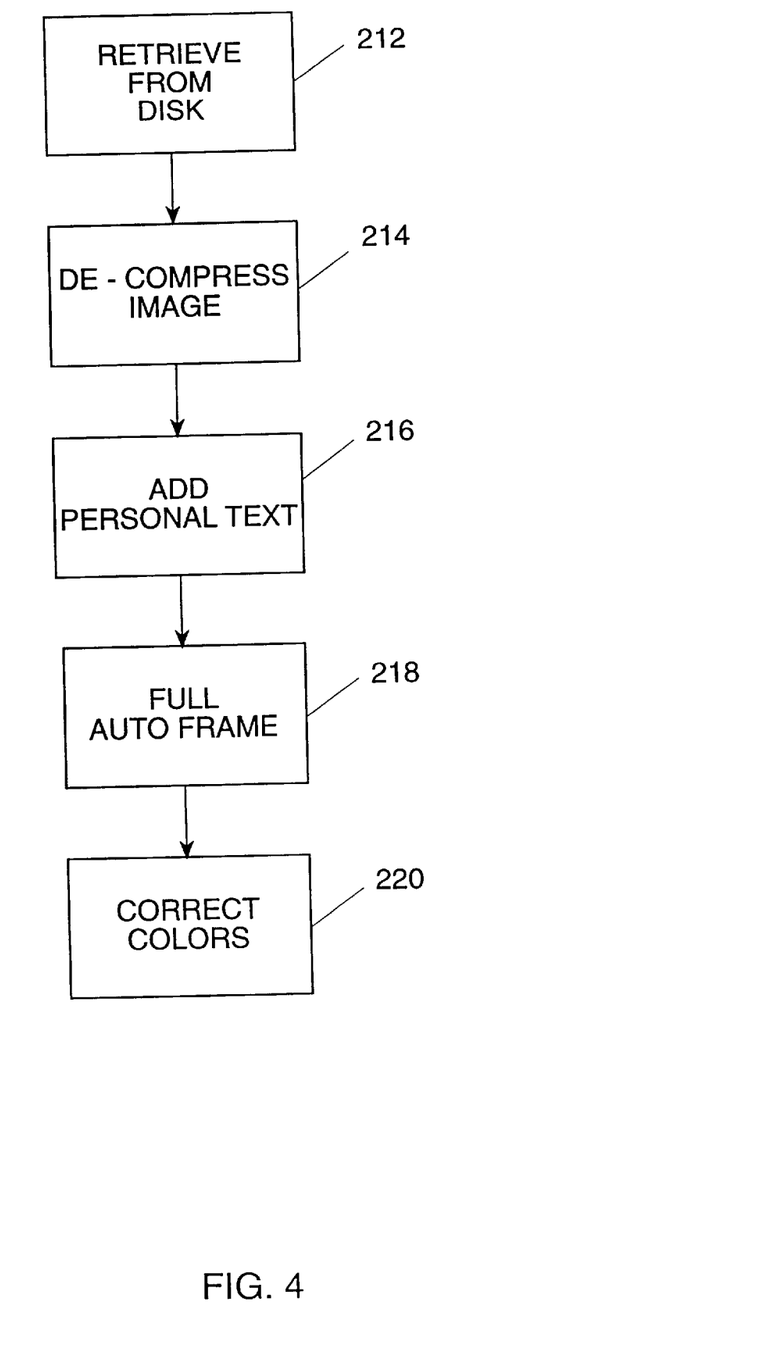
FIG. 4 is a schematic flow chart illustrations of the step of preprinting image editing of the method of FIG. 2.

It will be appreciated that by storing the images in two formats, the step of preprinting image editing described hereinbelow with reference to FIG. 4 is faster, so as to meet the required time constraints described hereinabove.

Step 208—As an optional step, the images are compressed and stored in a suitable storage device of the workstation 26. If the images are compressed, they are then decompressed for displaying them to the spectators.

It will be appreciated that although the method of employing the system 10 is shown herein as a sequential method, many of the step may overlap. For example, once the images are prepared for display and are being displayed (step 110), they may be prepared for printing (step 112), preferably as shown in FIG. 4.

As shown in FIG. 4, the preprinting image editing includes the steps of retrieving an image for editing from the disk of workstation 26 (step 212) and decompressing it if it is in a compressed form (step 214).

The image may now be further edited by the operator. For example, as indicated in step 216, text elements, such as an identification of the players or even the signature of one of the players shown in the image and which is stored in workstation 26 may be added.

It will be appreciated that preferably, the CT and LW formats are stored for each color separation of the image to be printed and therefore, misregistration between colors for each separation are automatically corrected by employing the automatic trapping procedure described in coassigned U.S. Pat. No. 5,113,249 to Yosefi (step 218).

Finally, if desired, the operator may correct any of the colors of the image as indicated by step 220.

A method for compressing and decompressing the images, referred to hereinabove with respect to FIGS. 3 and 4, is described hereinbelow with reference to FIGS. 5A, 5B and 6.

Figure 5A:
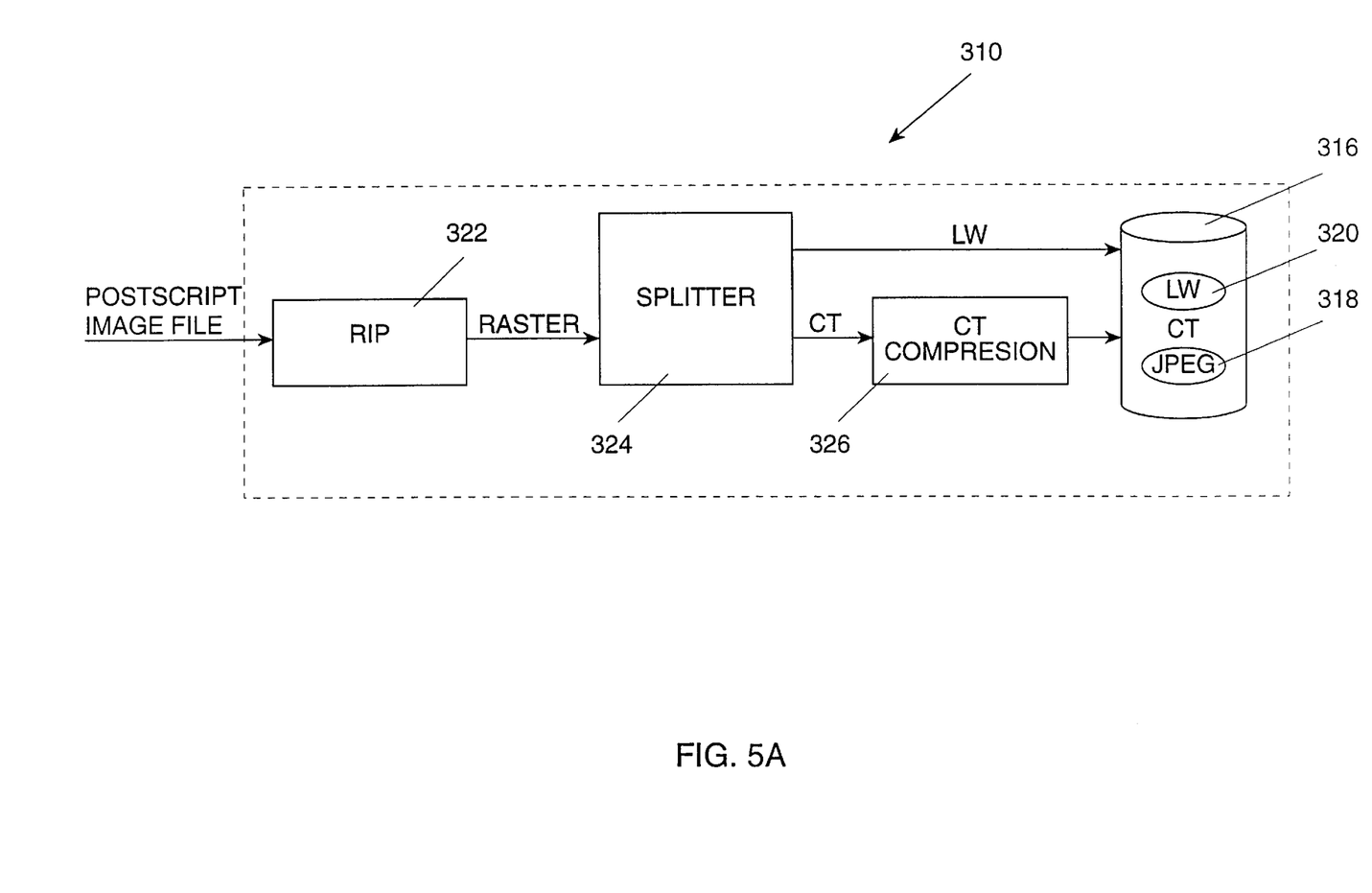
FIGS. 5A and 5B are block diagram illustrations respectively of a page compressor and decompressor, used in conjunction with the on demand printing system of FIG. 1.
Figure 5B:
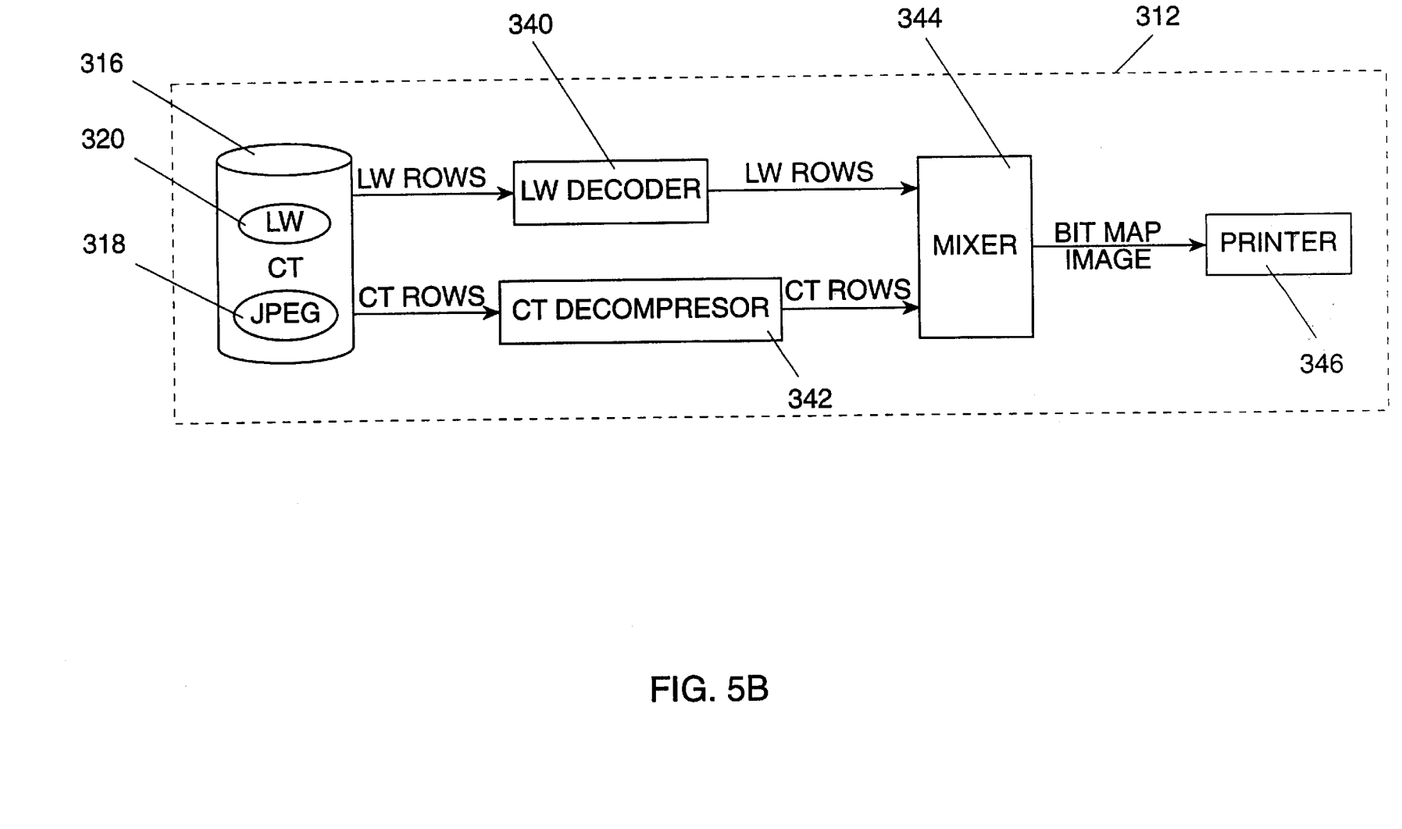
Figure 6:
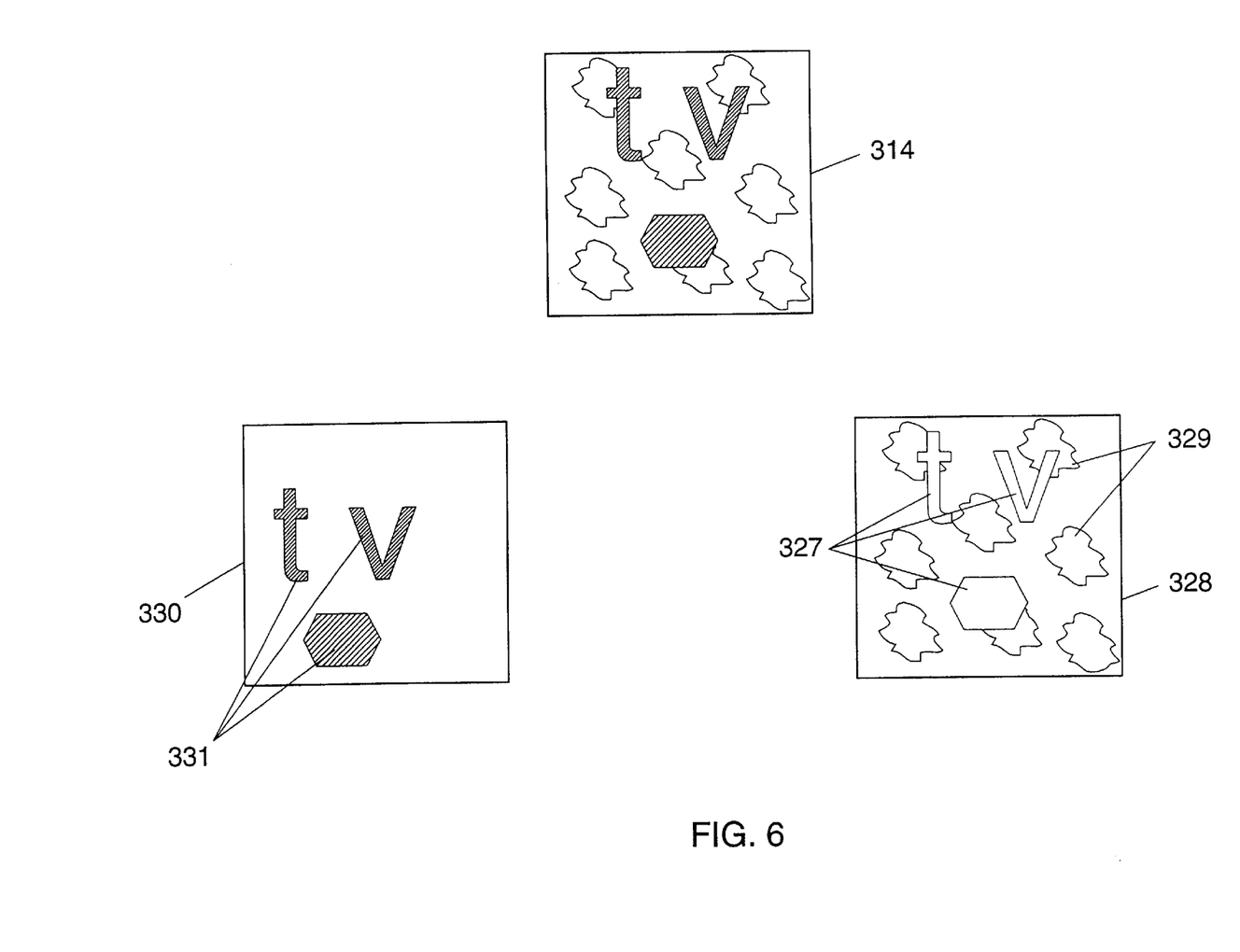
FIG. 6 is a schematic diagram illustration of a page to be compressed and its bitmap and text and graphics components.

FIGS. 5A and 5B respectively illustrate a page compressor 310 and its corresponding decompressor 312, constructed and operative in accordance with an exemplary preferred embodiment of the present invention. FIG. 6 illustrates an exemplary page 314 to be compressed.

The page 314 (FIG. 6) includes therein both CT graphic images and LW format having text and vector data.

The page compressor 310, which is used for compressing the image (step 208), splits each page into a CT page 328 (FIG. 6) and a LW page 330 having text and vector data therein. The CT page 328 comprises the continuous tone portions 329 and empty portions 327 indicating where text and vector data originally were located. Conversely, the linework page 330 comprises text and vector portions 331 located in their locations in the original page 314.

The CT page 328 is compressed according to standard image compression techniques, such as JPEG, and the more sensitive text and vector data of page 330 are encoded according to any LW encoding technique. The resultant pages are stored in a storage device 316 as two files, a compressed CT file 318 and an encoded linework file 320.

Because the linework page 330 has large empty sections where the CT portions 329 used to be, the encoded linework file 320 is quite small. Similarly, the CT file 318 is quite small since it has empty sections 327. Because the text and vector data has been removed from the CT page 328, the compression ratio for the CT portions 329 is thereby improved while at the same time preserving the quality of the text and graphics data.

Page decompressor 312 (FIG. 5B), used in decompressing (steps 200 and 214), decompresses JPEG compressed file 318 and decodes encoded linework file 320. The decompressed CT file and the decoded linework file are mixed together and provided, as a bitmap, to a printing device 346. Thus, the page 314 is recreated.

Since files 318 and 320 are both highly compressed, one block of each file will be decompressed to a large amount of page data. The decompression is utilized to match the speed of the disk 316 to that of the printer 346. If the disk 316 is five times slower to read a block of data than the printer 346 but the page compressor 310 has compressed the page (into the two files 318 and 320) by a ratio of 5:1, decompressor 312 can decompress a block of the compressed page into five blocks of the real page. The printer 346 will print the five blocks of real page while the disk 316 accesses the next block of compressed page.

Since the present invention separately compresses the CT and linework data, the resultant decompressed page maintains the quality of both the CT and the linework sections. Furthermore, the compression ratios for each file 318 and 320 are very high. Therefore, it is possible to match the speed of the disk 316 to that of the much faster printer 346 without the need to store the bitmap of the page in a storage device, such as a random access memory.

When operating on files described in a page description language (PDL), such as PostScript files, originally commercialized by Adobe Inc of California, USA, page compressor 310 comprises a raster image processor (RIP) 322, a rasterized image splitter 324 and a CT image compressor 326.

RIP 322 receives the page 314 described in the PostScript language, and creates a raster image of the page 314. Splitter 324, reviews the raster output of RIP 322 and determines which portions of the page are CT portions and which are text and graphics. The splifter 324 provides the CT portions 329, and their locations in the page 314, to the CT compressor 326. CT compressor 326 compresses the CT data using any suitable compression technique, such as JPEG, and stores the resultant CT page as compressed file 318. Splitter 324 encodes the text and graphics portions 331, in their locations in the page 314, using run-length encoding and stores the resultant encoded page in file 320. Both files are stored in storage device 316.

Page decompressor 312 comprises a decoder 340, a CT decompressor 342 and a mixer 344. CT decompressor 342, such as the CL560 JPEG decompressor commercially available from C-Cube Inc., USA, decompresses compressed file 318. Decoder 340, decodes encoded file 320. Mixer 344, mixes the output of the decompressor 342 and the decoder 340 and provides the resultant decompressed page to the printer 346.

It will be appreciated by persons skilled in the art that although the compression and decompression has been described hereinabove with respect to on-demand printing of sports scenes and the like, the method may be applied to the printing of any type of LW and CT images. The CT portions can be images received by scanning a photograph and/or artificial bitmap graphical constructs, such as degrades or vignettes. It will be appreciated by persons skilled in the art that the present invention is not limited to what has been particularly shown and described hereinabove. Rather the scope of the present invention is defined only by the claims which follow:

We claim:

1. A method for outputting an initial page comprising continuous tone images, text and vector data, the method comprising the steps of:

a. retrieving a first file of a compressed continuous tone image page and a second file of an encoded linework page from a magnetic storage medium, wherein said continuous tone image page has only the continuous tone elements in their locations in said initial page and said linework page has only the text and vector data in their locations in said initial page;

b. decompressing said first file of said compressed continuous tone image page thereby to produce a larger, third file of said continuous tone image page;

c. decoding said second file of said encoded linework page thereby to produce a larger, fourth file of said linework page;

d. mixing said third and fourth files together thereby to produce a section of said initial page;

e. transferring said section of said initial page to a printer for printing; and f. repeating said steps of retrieving, decompressing, decoding, mixing and transferring until said initial page is fully printed, wherein said steps of decompressing, decoding, mixing and transferring occur over generally the same amount of time that said step of retrieving occurs.

2. A method according to claim 1 wherein said third and fourth files are of the same size.

* * * * *

UNITED STATES PATENT AND TRADEMARK OFFICE
CERTIFICATE OF CORRECTION

PATENT NO. : 5,864,651
DATED : January 26, 1999
INVENTOR(S) : Reuven Lavie et al.

It is certified that error appears in the above-identified patent and that said Letters Patent is hereby corrected as shown below:

On the title page, Item [63], Related U.S. Application Data after

"CONTINUATION SERIAL NO. 672,325, JUNE 25, 1996", insert --ABANDONED--.

Signed and Sealed this

Fifteenth Day of June, 1999

Attest:

Q. TODD DICKINSON

Attesting Officer

Acting Commissioner of Patents and Trademarks